United States Patent
Renn et al.

[11] Patent Number: 5,871,428
[45] Date of Patent: Feb. 16, 1999

[54] ROLL ARRANGEMENT

[75] Inventors: Sandra Renn; Wolf Gunter Stotz, both of Ravensburg, Germany

[73] Assignee: Voith Sulzer Papiermaschinen GmbH, Heidenheim, Germany

[21] Appl. No.: 493,180

[22] Filed: Jun. 21, 1995

[30]     Foreign Application Priority Data

Jul. 1, 1994 [DE] Germany .......................... 44 23 213.6

[51] Int. Cl.$^6$ ..................................................... B23P 15/00
[52] U.S. Cl. ........................................ 492/7; 492/2; 492/5
[58] Field of Search ................................. 492/1, 7, 5, 2, 492/20; 100/162, 168

[56]          References Cited

U.S. PATENT DOCUMENTS

| | | | |
|---|---|---|---|
| 4,228,571 | 10/1980 | Biondetti . | |
| 4,530,227 | 7/1985 | Schlatter . | |
| 4,570,314 | 2/1986 | Holik . | |
| 4,583,273 | 4/1986 | Schnyder . | |
| 4,747,195 | 5/1988 | Snellman . | |
| 4,805,279 | 2/1989 | Pav . | |
| 5,033,176 | 7/1991 | Schiel . | |
| 5,290,223 | 3/1994 | Lehmann | 492/7 |
| 5,329,847 | 7/1994 | Schiel . | |
| 5,509,883 | 4/1996 | Niskanen et al. | 492/7 |
| 5,566,451 | 10/1996 | Niskanen et al. | 492/7 |

FOREIGN PATENT DOCUMENTS

| | | |
|---|---|---|
| 2129767 | 1/1995 | Canada . |
| 0 141141 | 5/1985 | European Pat. Off. . |
| 0258478 | 3/1988 | European Pat. Off. . |
| 0 340 193 | 11/1989 | European Pat. Off. . |
| 2759035 | 10/1979 | Germany . |
| 3126492 C2 | 10/1983 | Germany . |
| 3525950 A1 | 12/1986 | Germany . |
| 3637108 A1 | 6/1987 | Germany . |
| 3317974 C2 | 11/1988 | Germany . |
| 3925019 A1 | 2/1991 | Germany . |
| 4204177 A1 | 8/1993 | Germany . |
| 9205796 U | 10/1993 | Germany . |
| 4321400 A1 | 11/1993 | Germany . |
| 4322876 A1 | 11/1993 | Germany . |
| 2011555 | 7/1979 | United Kingdom . |
| 2041161 | 9/1980 | United Kingdom . |
| 2178509 | 2/1987 | United Kingdom . |

*Primary Examiner*—Irene Cuda
*Attorney, Agent, or Firm*—Townsend and Townsend and Crew LLP

[57]          ABSTRACT

A roll arrangement is described with a rotatable roll jacket, a fixed carrier and a multi-part support arrangement disposed between the roll jacket and the carrier and consisting of sliding shoes which are movable in the radial direction relative to the roll jacket. In this arrangement neighboring sliding shoes in the axial direction and/or in the circumferential direction of the roll jacket are biased towards one another groupwise in gap-free manner while maintaining relative movability.

36 Claims, 4 Drawing Sheets

ROLL ARRANGEMENT

BACKGROUND OF THE INVENTION

The invention relates to a roll arrangement comprising a rotatable, preferably flexible roll jacket, a stationary carrier and a multi-part support arrangement which is disposed between the roll jacket and the carrier, with the roll arrangement including sliding shoes which are movable in the radial direction relative to the roll jacket and have support surfaces facing the roll jacket.

Such roll arrangements are for example used for the treatment of paper webs. It is extremely important, in particular in the smoothing of paper webs, that the press force which is exerted onto the paper web by the support arrangements via the roll jacket is uniform over the width of the paper web. Even the smallest differences in the pressing force can lead to relatively large differences with respect to the smoothing effect. In practice this means that the paper web has been smoothed to different degrees over its width after passing through the smoothing zone. Such differences represent deficiencies in quality which can make the paper unmarketable.

A roll arrangement intended for the smoothing of a paper web is known from DE 43 22 876 A1 in which support arrangements are used in the form of sliding shoes which can be pressed against the roll jacket and which are built up from individual sections in the form of beams which follow one another in the running direction. The beams can also be subdivided into sections transverse to the running direction of the web. Use can be made of either a single large pressing element which can act on the entire shoe consisting of individual sections, or of several pressing elements which are associated with the individual sections or portions. The aim of subdividing the sliding shoe into individual sections of portions is to avoid distortion effects which can arise in a one-piece shoe and which impair the smoothing quality, and also to maintain the geometry of the smoothing zone even with changing operating temperatures.

In order to avoid the unavoidable partition gaps between the individual sections or portions leaving tracks in the paper web, provision is made in this known arrangement for the surface of the sliding shoe consisting of individual sections which faces the roll to be covered by a layer which forms the sliding surface and which is weak in bending and can consist of a foil or of a piece of sheet metal.

With such a layer, which in other respects can only be used if no hydrostatic support of the roll jacket is required, it is not however possible to avoid a loss of support at the gaps between the individual sections. A loss of support and oil in the region of the existing gaps which results from the subdivision of the unitary sliding shoe into individual sections or portions has a negative effect on the pressing force distribution transverse to the direction of running of the web and leads to deficiencies in quality of the respectively processed product.

SUMMARY OF THE INVENTION

The object of the present invention is to so design a roll arrangement of the initially named kind that the disadvantageous gap losses of hydraulic fluid and thus of supporting force are avoided or are at least largely precluded.

This object is essentially satisfied in that neighboring sliding shoes in the axial direction and/or in the circumferential direction of the roll jacket are arranged in a gap-free manner and/or are mutually clamped together groupwise while maintaining relative movability.

Through the measures of the invention, a multi-part support arrangement is provided which behaves essentially as a one-piece support arrangement but does not have its disadvantages with respect to the adaptability to the respective roll jacket which can be designed from stiff to highly flexible. The deficiencies of one-piece sliding shoes originating from distortion, thermal expansion or geometry errors which are also deleterious for the hydrodynamic or hydrostatic lubrication no longer appear in disturbing manner in the arrangement of the invention. Thus, in the practical use of such roll arrangements, surprisingly advantageous results can be obtained, in particular with respect to the uniformity that can be achieved or to the intentionally controllable disuniformity of the press force distribution in the press gap. The quality of a paper web processed by means of such a roll arrangement can thus be substantially increased.

Neighboring sliding shoes preferably do not contact one another over their full area but are rather only in contact with one another via web-like contact surfaces disposed at their support surface sides, so that the clamping force which keeps the individual sliding shoes together only enters into effect in the region of these comparatively small area contact surfaces. Should tilting tendencies arise between neighboring sliding shoes, this design ensures that the resulting tilting axis only has a very small spacing from the respective roll jacket and in this way only very small wedge gaps arise. In practice these do not open towards the carrier and do not lead to any notable loss of hydraulic fluid and thus practically also to no drop in the pressing force.

The mutual clamping of the individual sliding shoes preferably takes place by means of clamping wires which are guided through bores which pass through the sliding shoes in the region of the contact surfaces.

A further advantage which arises when using this invention with jackets that are stiff in bending results from the fact that the required quantity of oil for the lubricating film is reduced by more than one half. This is in contrast to the situation with customary individual sliding shoes arranged spaced from one another because these lose oil over their entire support surface boundary.

DETAILED DESCRIPTION OF THE PREFERRED EXEMPLARY EMBODIMENTS

Figure 1:
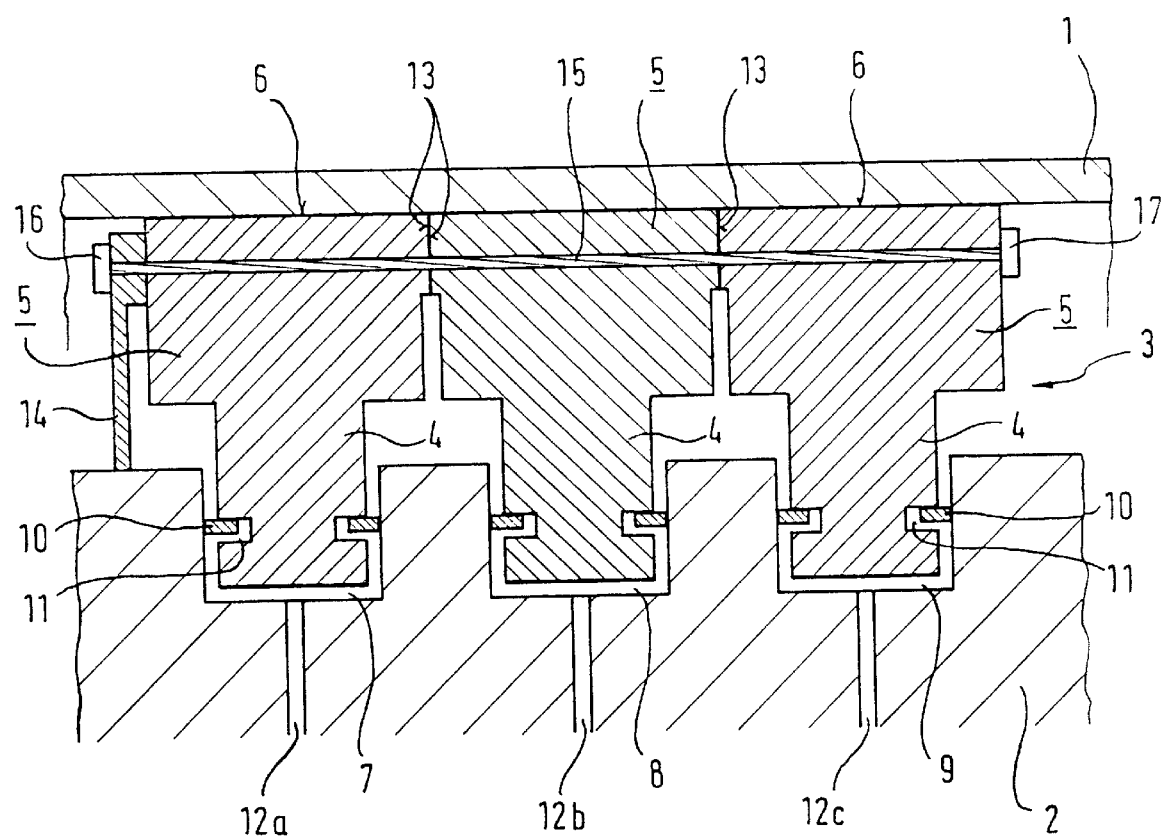
FIG. 1 is a partial longitudinal sectional view of a first embodiment of a roll arrangement in accordance with the present invention.

In accordance with FIG. 1, a roll arrangement in accordance with the present invention includes a roll jacket, a stationary carrier 2 and a support arrangement 3 provided between the roll jacket 1 and the carrier 2.

The support arrangement 3 consists of several adjoining sliding shoes 5 with respectively associated feet 4 which are formed in one piece with the sliding shoes 5 or which can also be tiltably connected to the sliding shoes 5.

Each sliding shoe 5 has a support surface 6 associated with the roll jacket 1 which is shaped in approximation to the shape of the roll jacket 1. With corresponding flexibility of the roll jacket 1, the sliding shoes 5 can, if necessary, have a convex shape of the support surface.

The feet 4 of the sliding shoes 5 engage in a piston-like manner in pressure chambers 7, 8, 9 which are formed in the carrier 2. Sealing elements 10 are arranged in recesses 11 of the feet 4 and contact the pressure chamber walls.

The pressure chambers 7, 8, 9 can be individually pressurized with a pressure medium via bores 12a, 12b, 12c provided in the carrier 2 so that the supporting forces can be individually selected.

Respective neighboring sliding shoes 5 of the support arrangements 3 lie directly against one another but not in full area contact. Instead they only contact one another via contact surfaces 13 disposed at the support surface ends. These contact surfaces 13 act as sealing surfaces and are clamped to one another in this contact state.

The contact surfaces 13 at which the clamping forces are effective are designed to have a comparatively small area and extend up to the respective support surface 6 so that a practically gap-free transition is provided between the individual sliding shoes 5. The mutual clamping of the sliding shoes 5 admittedly continues to ensure relative movability between the individual sliding shoes 5, which is necessary in order to ensure the required high adaptability to the roll jacket 1, but it prevents relative mutual tilting to the extent that only very small wedge gaps can arise which do not lead to any loss of oil and thus also do not lead to any loss of support force.

The required clamping forces are preferably generated by clamping wires 15 which are led through mutually aligned bores which pass through the sliding shoes 5 in the region of the contact surfaces 13 and which can be tensioned to the respectively required degree by means of suitable tensioning means 16, 17. This level of tension can be differentially selected in dependence on the operating circumstances, in particular in dependence on the lubricant pressure prevailing between the roll jacket and the sliding shoe.

The application of the respectively desired clamping force can also take place by hydraulic, pneumatic, electromagnetic, mechanical or motorically actuated clamping means and can, if necessary, be modified, controlled or regulated in dependence on the operating conditions.

In order to ensure that the sliding shoe unit provided by mutual clamping of individual sliding shoes 5 is clearly positioned transverse to the running direction of the roll jacket 1, and also in the running direction of the roll jacket, the respective sliding shoe unit can be centrally fixed or, alternatively, fixed at one end, and can in particular also be biased against an axial abutment 14 which is formed at the carrier side. The respective fixation of the sliding shoe unit does not thereby impair the relative movability of the individual sliding shoes 5 which are clamped against one another in a gap-free manner.

The roll jacket 1 can be hydrostatically or hydrodynamically supported in a known manner with respect to the support surfaces 6 of the sliding shoes 5.

Instead of an individual pressure loading of the individual sliding shoes 5 of a sliding shoe unit consisting of a plurality of mutually clamped sliding shoes 5, it is also possible for a uniform loading of the sliding shoes to take place since a sliding shoe unit of this kind is arranged in a common pressure trough in the manner of a one-piece sliding shoe.

Figure 2:
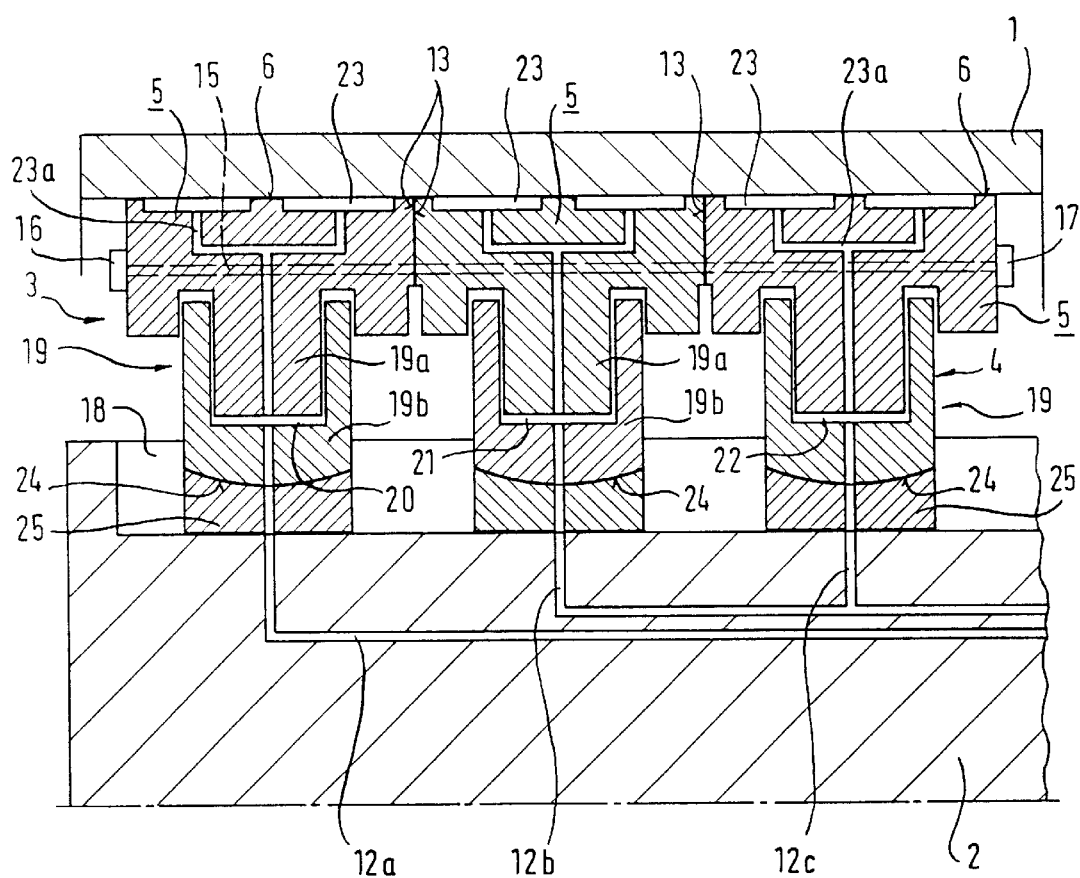
FIG. 2 is a partial longitudinal sectional view of an alternative embodiment of a roll arrangement in accordance with the present invention.

An alternative embodiment of a roll arrangement in accordance with the present invention is shown in FIG. 2, and components of this embodiment are designated with the same reference numerals as the corresponding components of the embodiment shown in FIG. 1.

The roll arrangement of FIG. 2 again comprises a roll jacket 1, a fixed carrier 2 and a support arrangement 3 provided between the roll jacket 1 and the carrier 2. The support arrangement 3 consists of a plurality of sliding shoes 5 which are clamped together over their contact surfaces 13 by means of a clamping wire 15 and suitable tensioning means 16, 17 and are thus combined into a sliding shoe unit.

In contrast to the embodiment of FIG. 1, the feet 4 associated with the sliding shoes 5 do not directly engage in recesses of the carrier 2 while forming piston-in-cylinder units but rather multi-part feet 4 are used.

The feet 4 consist, in the embodiment of FIG. 2, of a preferably cylindrical sliding shoe projection 19a which engages into a corresponding recess of the intermediate part 19b while forming a piston-in-cylinder unit 19. Each of the intermediate parts 14b is supported via a tilting bearing 24 with spherical support surfaces on a base part 25 which is preferably displaceably supported on the base surface of a recess 18 of the carrier 2 which extends in the axial direction of the roll jacket.

Through the provision of a tilting bearing 24 and the free displaceability of the base part 25 on the carrier 2, the possibilities of adaptation of the sliding shoes 5 to the deformations of the roll jacket are further improved and it is ensured that neither disturbing stresses within the sliding shoe unit consisting of a plurality of sliding shoes 5 nor differential extensions can occur because corresponding compensation movements are ensured in the region of the tilting journal 24 and through displacements of the base part 25 relative to the carrier 2.

The piston-in-cylinder units 19 which, if necessary, can be combined with a mechanical prestressing unit acting in the same direction have their pressure spaces 20, 21, 22 connected with pressure medium bores 12a, 12b, 12c and can be energized with pressure fluid individually as in the case of the pressure space 20, or groupwise, as in the case of the pressure chambers 21, 22.

In their support surfaces 6 the sliding shoes 5 have pressure pockets 23 which can be supplied with a hydraulic fluid for the hydrostatic support of the roll jacket 1. In the illustrated embodiment the pressure pockets 23 are connected for this purpose to the pressure chambers 20, 21, 22 of the piston-in-cylinder units 19 via throttling supply bores 23a.

Figure 3:
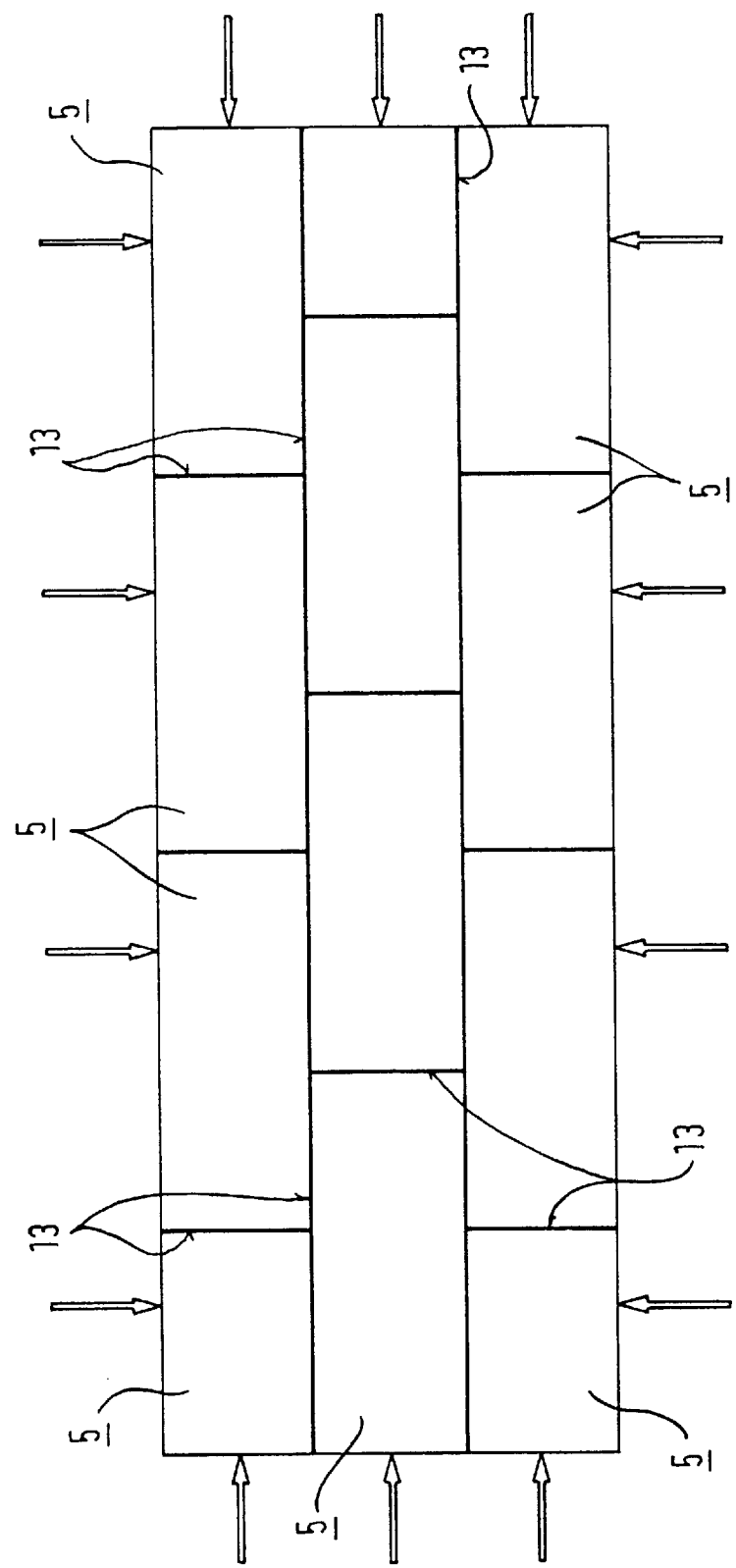
FIG. 3 is a plan view of a plurality of adjacent sliding shoes of a roll arrangement seen sectionwise.

FIG. 3 shows in plan view a group of sliding shoes 5 of a roll arrangement arranged adjacent to one another in accordance with the invention, with the sliding shoes 5 being arranged alongside one another in the axial and in the circumferential direction of the roll jacket. Specifically, three rows of sliding shoes extending in the axial direction are provided alongside one another in the circumferential direction with the sliding shoes 5 being arranged mutually displaced to one another.

FIG. 3 shows simply schematically by way of arrows that the sliding shoes 5 are clamped against one another both in the axial direction and also in the circumferential direction of the roll jacket. Moreover, fixed points can be provided by non-illustrated axial and/or circumferential abutments which ensure an unambiguous positioning of the so-formed sliding shoe unit.

It should also be mentioned that flow channels for a suitable fluid can be provided which extend through the sliding shoes 5 for the provision of temperature compensation within the respective sliding shoes.

It is likewise possible to provide a hydrodynamic support with respect to the sliding shoes 5 in place of the hydrostatic support of the roll jacket shown in FIG. 2 without this affecting the basic principle of sliding shoes mutually clamped together groupwise in a gap-free manner while maintaining relative movability.

Figure 4:
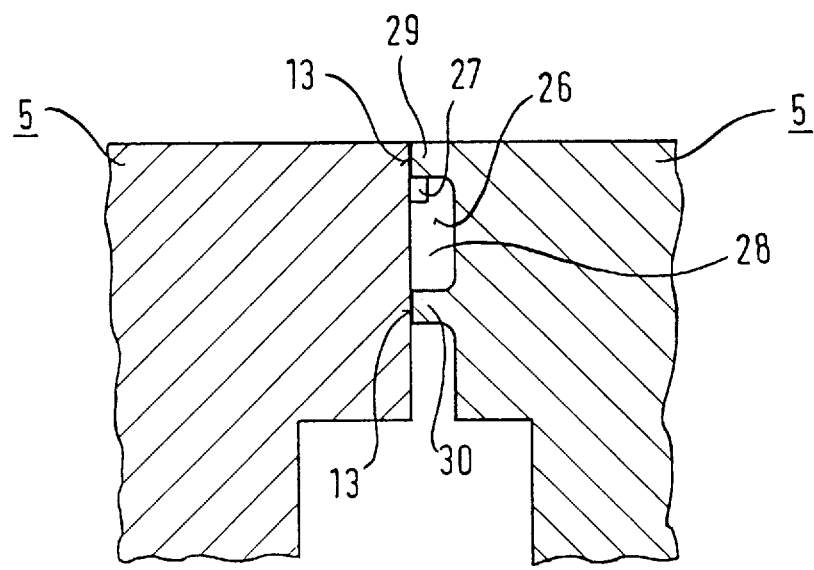
FIG. 4 is a partial sectional illustration of two adjoining sliding shoes.
Figure 5:
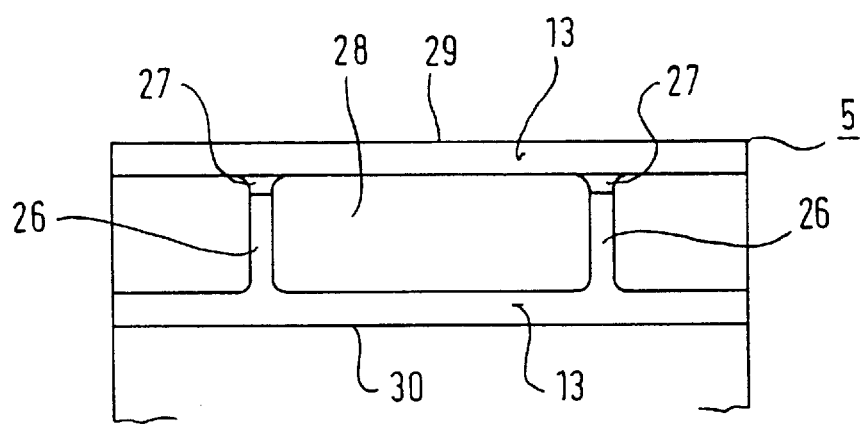
FIG. 5 is a plan view of the contact surface of the right-hand sliding shoe of FIG. 4.

FIGS. 4 and 5 show that the contact surfaces 13 between the adjacent sliding shoes 5 need not be made flat over the full area but rather that recesses 28 can be provided in at least one of the two contact surfaces 13.

In accordance with the variation of FIGS. 4 and 5, one of the contact surfaces 13 is so formed that the areal contact between two adjacent sliding shoes is only small, which has the consequence that on building up a hydraulic pressure only a small force is obtained which could press the sliding shoes apart from one another. At the same time the contact surface 13 is so designed that with a relative displacement of the contacting surfaces, these cannot hook into one another.

The recess 28 in the contact surface 13 is so designed that the web 29 which results at the jacket side is very narrow while the web 30 at the carrier side can have a comparable dimension or could also be made broader. As a non-restrictive example, it is mentioned that the web at the jacket side can have a width of approximately 1 mm.

The recess 28 is subdivided by vertical webs 26 and passages 27 are provided in these webs 26 which ensure a connection between the individual part regions of a recess 28 in the surface 13. Because of these passages 27 no hydraulic pressure can build up in the chambers 28 and on the webs 26 and 30.

It has already been mentioned that recesses such as the recess 28 of FIG. 5 can be provided in the two cooperating contact surfaces 13; however it is also sufficient if only one of the contact surfaces has such a configuration as shown in the FIGS. 4 and 5.

In accordance with FIG. 4 each sliding shoe 5 is provided with an undercut adjoining the respective contact surface 13, however it would be entirely sufficient to provide such an undercut only in one of the two cooperating sliding shoes 5, which represents a simplification from the technical manufacturing viewpoint.

What is claimed:

1. A roll arrangement comprising a rotatable roll jacket, a stationary carrier and a multi-part support arrangement which is disposed between the roll jacket and the carrier, with the roll arrangement including sliding shoes which are movable in a radial direction relative to the roll jacket and have support surfaces facing the roll jacket, wherein neighboring sliding shoes in an axial direction defined by an axis of rotation of the roll jacket are clamped against one another groupwise in a gap-free manner while maintaining relative movability thereof.

2. A roll arrangement in accordance with claim 1, wherein neighboring sliding shoes only contact one another at their support surface ends in a region of web-like contact surfaces and are spaced apart at the carrier side.

3. A roll arrangement in accordance with claim 2, wherein the contact surfaces of neighboring sliding shoes are planar.

4. A roll arrangement in accordance with claim 1, wherein neighboring sliding shoes along a circumferential direction of the roll jacket are arranged such that they are displaced in the axial direction of the roll jacket.

5. A roll arrangement in accordance with claim 1, wherein a radial extent of contact surfaces is smaller than a radial extent of the oppositely disposed spaced apart walls of sliding shoes.

6. A roll arrangement in accordance with claim 1, wherein resilient elements which pass through the sliding shoes and are kept in tension are provided for the mutual clamping of the sliding shoes.

7. A roll arrangement in accordance with claim 6, wherein the resilient elements are clamping wires that are guided through mutually aligned bores which pass through the sliding shoes in a region of contact surfaces.

8. A roll arrangement in accordance with claim 1, wherein pneumatic, electromagnetic, mechanical or motorically stressed clamping means are provided for applying the clamping force.

9. A roll arrangement in accordance with claim 1, wherein an amount of force with which the sliding shoes can be clamped against one another is variably adjustable.

10. A roll arrangement in accordance with claim 1, wherein the sliding shoes are fixed at one end against displacement in the axial direction of the roll jacket and are clamped against an axial abutment.

11. A roll arrangement in accordance with claim 1, wherein neighboring sliding shoes along a circumferential direction of the roll jacket which are clamped against one another are secured against displacement in the circumferential direction of the roll jacket by a peripheral abutment.

12. A roll arrangement in accordance with claim 1, wherein a foot is associated with each sliding shoe and forms a hydraulically or pneumatically loadable piston-in-cylinder unit together with a surface on the carrier.

13. A roll arrangement in accordance with claim 12, wherein the piston-in-cylinder units can be pressurized individually.

14. A roll arrangement in accordance with claim 1, wherein pressure pockets are provided in the support surfaces of the sliding shoes for hydrostatic support of the roll jacket and are pressurized with a hydraulic medium.

15. A roll arrangement in accordance with claim 1, wherein a hydraulic medium is supplied to the support surfaces for hydrodynamic support of the roll jacket.

16. A roll arrangement in accordance with claim 1, wherein the support surfaces have a concave shape.

17. A roll arrangement in accordance with claim 1, wherein flow channels for a temperature compensation fluid are provided in the sliding shoes.

18. A roll arrangement in accordance with claim 1, wherein groups of mutually clamped sliding shoes are respectively arranged in a common pressure trough in a manner of a multi-part piston of areal design.

19. A roll arrangement in accordance with claim 1, wherein at least one outwardly open recess is provided in at least one contact surface.

20. A roll arrangement in accordance with claim 19, wherein the recess in a contact surface is subdivided by at least one web into individual regions with the individual regions communicating with one another via a passage in the respective web.

21. A roll arrangement in accordance with claim 19, wherein a web which bounds the recess at the jacket side is of very narrow design and its width is approximately 1 mm.

22. A roll arrangement in accordance with claim 20, wherein the passage formed in the respective web is provided adjacent to a jacket side web.

23. A roll arrangement in accordance with claim 1, wherein the sliding shoes are flat.

24. A roll arrangement in accordance with claim 1, wherein a flexible cloth is provided as the roll jacket which adapts to the contour of a respective counter-roll.

25. A roll arrangement in accordance with claim 1 wherein the rotatable roll jacket is flexible.

26. A roll arrangement in accordance with claim 1 wherein the neighboring sliding shoes are neighboring in a circumferential direction defined by the roll jacket instead of neighboring in an axial direction.

27. A roll arrangement in accordance with claim 26 wherein the neighboring sliding shoes are also neighboring in an axial direction defined by an axis of rotation of the roll jacket.

28. A roll arrangement in accordance with claim 2 wherein the neighboring sliding shoes sealingly contact one another.

29. A roll arrangement in accordance with claim 1 wherein the sliding shoes are fixed at the center against displacement in the axial direction of the roll jacket and are clamped against an axial abutment.

30. A roll arrangement in accordance with claim 1 wherein the neighboring sliding shoes along a circumferential direction of the roll jacket which are clamped against one another are biased against a peripheral abutment.

31. A roll arrangement in accordance with claim 1 wherein a foot is associated with each sliding shoe and forms a hydraulically or pneumatically loadable piston-in-cylinder unit together with a base element supported on the carrier, with the base element preferably being displaceably journalled relative to the carrier.

32. A roll arrangement in accordance with claim 12 wherein the piston-in-cylinder units can be pressurized in groups.

33. A roll arrangement in accordance with claim 14 wherein the pressure pockets are pressurized with the hydraulic medium from pressure spaces of the piston-in-cylinder units.

34. A roll arrangement in accordance with claim 1 wherein the support surfaces have a convex shape.

35. A roll arrangement in accordance with claim 1 wherein the sliding shoes are convex.

36. A roll arrangement in accordance with claim 1 wherein the sliding shoes are concave.

* * * * *